United States Patent
Zhang et al.

(10) Patent No.: US 9,774,549 B2
(45) Date of Patent: *Sep. 26, 2017

(54) METHOD AND APPARATUS FOR DISPLAYING INSTANT MESSAGING (IM) MESSAGE

(71) Applicant: TENCENT TECHNOLOGY (SHENZHEN) COMPANY LIMITED, Shenzhen, Guangdong Province (CN)

(72) Inventors: Chunhua Zhang, Shenzhen (CN); Shuo Min, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 515 days.

This patent is subject to a terminal disclaimer.

(21) Appl. No.: 14/543,602

(22) Filed: Nov. 17, 2014

(65) Prior Publication Data

US 2015/0067535 A1    Mar. 5, 2015

Related U.S. Application Data

(63) Continuation of application No. 13/796,893, filed on Mar. 12, 2013, which is a continuation of application No. PCT/CN2011/079433, filed on Sep. 7, 2011.

(30) Foreign Application Priority Data

Dec. 3, 2010 (CN) .......................... 2010 1 0588433

(51) Int. Cl.
*G06F 3/0481* (2013.01)
*H04L 12/58* (2006.01)
(Continued)

(52) U.S. Cl.
CPC ........ *H04L 51/043* (2013.01); *G06F 3/04847* (2013.01); *G06F 17/212* (2013.01); *H04L 51/04* (2013.01)

(58) Field of Classification Search
CPC ........................... G06F 3/0481; G06Q 10/109
See application file for complete search history.

(56) References Cited

U.S. PATENT DOCUMENTS 5,001,697 A * 3/1991 Torres ................... G06F 3/0481
                                                        345/467
5,751,283 A * 5/1998 Smith ................... G06F 3/0481
                                                        345/660

(Continued)

FOREIGN PATENT DOCUMENTS

| CN | 1980137 A | 6/2007 |
| CN | 101449270 A | 6/2009 |
| CN | 101478732 A | 7/2009 |

OTHER PUBLICATIONS

Working screenshot of Trillian 4.2 build 20, Instant Messaging software manufactured by Trillian, released on Jun. 23, 2010, 5 pages.*

(Continued)

*Primary Examiner* — Reza Nabi
(74) *Attorney, Agent, or Firm* — Tim Tingkang Xia, Esq.; Locke Lord LLP

(57) ABSTRACT

A method and an apparatus for displaying an Instant Messaging (IM) message are provided. The method includes, when the size of a picture to be processed is greater than the size of a container, setting the display size of the picture to be processed to be not greater than the size of the container; and drawing the picture to be processed according to the set display size. As such, a picture to be processed having the size greater than the container size can be adapted to the size of a container in IM software, and the IM software can (Continued)

directly display the entirety of the picture that is originally greater than the container size.

20 Claims, 7 Drawing Sheets

(51) Int. Cl.
G06F 3/0484 (2013.01)
G06F 17/21 (2006.01)

(56) References Cited

U.S. PATENT DOCUMENTS

| | | | | |
|---|---|---|---|---|
| 6,456,305 | B1* | 9/2002 | Qureshi | G06F 17/30905 707/E17.121 |
| 7,421,661 | B1* | 9/2008 | Canfield | G06Q 10/107 715/711 |
| 7,546,537 | B2* | 6/2009 | Crawford | H04L 51/04 715/723 |
| 7,774,410 | B2* | 8/2010 | Gang | G06Q 10/107 709/206 |
| 8,103,734 | B2* | 1/2012 | Galli | G06F 9/547 709/206 |
| 8,115,772 | B2* | 2/2012 | Ostermann | G06Q 30/0601 345/473 |
| 8,117,271 | B2* | 2/2012 | McConn | G06Q 10/107 709/206 |
| 8,365,081 | B1* | 1/2013 | Amacker | G06Q 10/10 705/27.1 |
| 8,443,290 | B2* | 5/2013 | Bill | G06F 17/30749 709/206 |
| 2004/0177116 | A1* | 9/2004 | McConn | G06Q 10/107 709/204 |
| 2005/0091610 | A1* | 4/2005 | Frei | G06F 3/0481 715/804 |
| 2005/0188016 | A1* | 8/2005 | Vdaygiri | G06Q 10/10 709/205 |
| 2006/0184886 | A1* | 8/2006 | Chung | G06F 17/30873 715/758 |
| 2007/0186173 | A1* | 8/2007 | Both | G06Q 10/107 715/753 |
| 2009/0049125 | A1* | 2/2009 | Channabasavaiah | H04L 51/04 709/204 |
| 2010/0099445 | A1* | 4/2010 | Song | H04M 1/72552 455/466 |
| 2011/0138004 | A1* | 6/2011 | McConn | G06Q 10/107 709/206 |
| 2011/0282646 | A1* | 11/2011 | Bill | A63F 13/12 704/3 |
| 2013/0012271 | A1* | 1/2013 | Chi | H04M 1/72547 455/566 |
| 2013/0014042 | A1* | 1/2013 | Ren | G06F 3/0488 715/765 |

OTHER PUBLICATIONS

Working screenshot of Internet Explorer 8.0 manufactured by Microsoft, released on Mar. 19, 2009, 4 pages.*
State Intellectual Property Office of the P.R.China, "Search Report and First Chinese Office Action", Aug. 18, 2015.
State Intellectual Property Office of the P.R. China, "Second Chinese Office Action for 201010588433.5", China, Jan. 29, 2016.

* cited by examiner

METHOD AND APPARATUS FOR DISPLAYING INSTANT MESSAGING (IM) MESSAGE

CROSS-REFERENCE TO RELATED APPLICATIONS

This application is a continuation application of application Ser. No. 13/796,893, filed Mar. 12, 2013, entitled "METHOD AND APPARATUS FOR DISPLAYING INSTANT MESSAGING (IM) MESSAGE", by Chunhua ZHANG and Shuo MIN, now allowed, which itself is a continuation application of International Patent Application No. PCT/CN2011/079433, filed Sep. 7, 2011, entitled "IM MESSAGE DISPLAY METHOD AND DEVICE", by Chunhua ZHANG and Shuo MIN, which itself claims the priority to Chinese Patent Application No. 201010588433.5, filed Dec. 3, 2010, entitled "IM MESSAGE DISPLAY METHOD AND DEVICE", by Chunhua ZHANG and Shuo MIN, the disclosures for which are hereby incorporated herein in their entireties by reference.

FIELD OF THE INVENTION

The present invention relates generally to the field of instant messaging (IM), and more particularly to a method and apparatus for displaying an IM message.

BACKGROUND OF THE INVENTION

Along with the development of network technologies, Instant Messaging (IM) has become an indispensable communication method in people's daily life, and people may transfer information such as words, pictures, voices and videos through IM software in real time. Therefore, the IM software makes the communication among people much more convenient.

Pictures are a kind of files frequently transferred when people using the IM software. For example, when using the IM software, there are often needs to transfer pictures to each other through the IM software.

In the conventional IM software, a picture is usually presented during chat as follows:

1. For a container having horizontal and vertical scroll bars and supporting full size changing, the picture is usually displayed in the original size. If the size of the picture is greater than the size of the container, shielded areas of the picture may be viewed by dragging the scroll bars.

2. For a container having a vertical scroll bar and supporting full size changing, the picture is usually displayed in the original size. If the size of the picture is greater than the container size, shielded areas of the picture may be viewed by dragging to change the size of the container.

3. For a container in which a vertical scroll bar does not support vertical size changing, the picture is usually displayed in the original size. If the size of the picture is greater than the container size, shielded areas of the picture cannot be viewed.

Currently, when the IM software displays a picture, if the size of the picture to be displayed is greater than the size of the picture displaying container, due to the limit of the size of the picture displaying container, the picture displaying container of the IM software cannot directly display the entirety of the picture to be displayed, and can only display a part of the picture while shielding the other part of the picture. If a user intends to view the entire content of the picture, it is required to change the size of the picture displaying container manually, or drag the scroll bar of the picture displaying container, resulting in inconvenient operation.

Therefore, a heretofore unaddressed need exists in the art to address the aforementioned deficiencies and inadequacies.

SUMMARY OF THE INVENTION

The present invention is directed to, among other things, a method and an apparatus for displaying an IM message, so that a picture to be displayed that has the size greater than the container size can be adapted to the size of a container in IM software, and the IM software can directly display the entirety of the picture that is originally greater than the container size.

In one aspect of the present invention, the method includes, when a size of a picture to be processed is greater than a size of a container, setting a display size of the picture to be processed to be not greater than the size of the container; and drawing the picture to be processed according to the set display size.

In another aspect of the present invention, an apparatus for displaying an IM message has a setting unit, adapted to set a display size of a picture to be processed to be not greater than a size of the container when a size of the picture to be processed is greater than the size of the container; and a first drawing unit, adapted to draw the picture to be processed according to the set display size.

In the method and apparatus for displaying an IM message provided in the embodiments of the present invention, when the size of the picture to be processed is greater than the size of the IM software container, the IM software processes the picture, sets the display size of the picture to be processed to be not greater than the size of the IM software container, and then displays the picture with the set display size of the picture. Therefore, the picture to be processed having the size originally greater than the size of the IM software container can be adapted to the size of the IM software container, and the IM software can directly display the entirety of the picture that is originally greater than the container size.

In a further aspect, the present invention, the non-transitory computer-readable medium stores instructions which, when executed by one or more processors, cause the apparatus to perform the method for displaying an IM message.

These and other aspects of the present invention will become apparent from the following description of the preferred embodiment taken in conjunction with the following drawings, although variations and modifications therein may be effected without departing from the principle and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
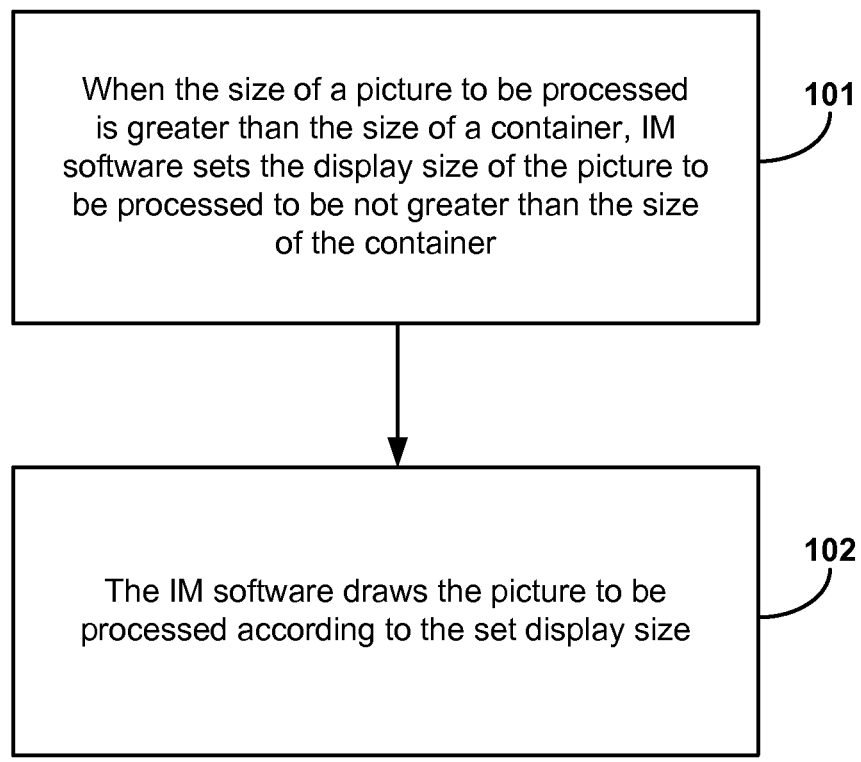
FIG. 1 is a flow chart of a method for displaying an IM message according to one embodiment of the present invention.

The following description is merely illustrative in nature and is in no way intended to limit the disclosure, its applications, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

As used herein, the singular forms "a", "an" and "the" are intended to include the plural forms as well, unless the context clearly indicates otherwise. As used herein, the term "and/or" includes any and all combinations of one or more of the associated listed items.

It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "picture" refers to a visual representation or image of an object, photographed, painted, sculptured, electronically acquired or otherwise made visible.

As used herein, the term "unit" or "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description is now made as to the embodiments of the present invention in conjunction with the accompanying drawings in FIGS. 1-7. In accordance with the purposes of this invention, as embodied and broadly described herein, this invention relates to a method and an apparatus for displaying an IM message. In certain embodiments, the IM message is displayed on a display device, such as, but being not limited to, a smartphone, a tablet, a laptop, a computer, or a smart television.

Referring to FIG. 1, a flowchart of a method for displaying an IM message is shown according to one embodiment of the present invention. The method includes the following steps.

Step 101: When the size of a picture to be processed is greater than the size of a container, IM software sets the display size of the picture to be processed to be not greater than the size of the container.

The container in the embodiment of the present invention refers to a container capable of displaying content of chatting messages, and can be classified into different types according to different attributes. In the disclosure, the container is mainly classified into two types: the container supporting dragging and the container supporting a scroll bar.

According to the present invention, the picture may be displayed in the container in the following manners: displaying in the original size, displaying self-adaptively, and displaying with a thumbnail. However, in the conventional IM software, the picture in the chatting content is displayed mainly in the original size.

When transmitting a picture by using the IM software, the transmitted picture may be greater than the size of the container of the IM software, and at this time, the container of the IM software only displays a part of the picture while shielding the other part of the container, so a user needs to enlarge the container through dragging or move the scroll bar so as to view the entire content of the picture.

In order to enable the IM software to present the picture having the size greater than the container size completely to the user, prior to displaying the picture, the IM software sets the display size of the picture to be processed to be not greater than the size of the container.

Step 102: The IM software draws the picture to be processed according to the set display size.

The picture having the size greater than the container size is drawn according to the set display size. In one embodiment, the display size of the picture has been set, by the IM software, to be not greater than the size of the container, and therefore, the IM software container is capable of presenting all content of the picture to the user when displaying the picture.

In the method for displaying an IM message provided in the exemplary embodiment of the present invention, when the size of the picture to be processed is greater than the size of the IM software container, the IM software processes the picture to be processed, sets the display size of the picture to be processed to be not greater than the size of the IM software container, and displays the picture in the set display size of the picture to be processed. Accordingly, the picture to be processed that has the size originally greater than the size of the IM software container can be adapted to the size of the IM software container, and the IM software can directly display the entirety of the picture that is originally greater than the container size.

Figure 2:
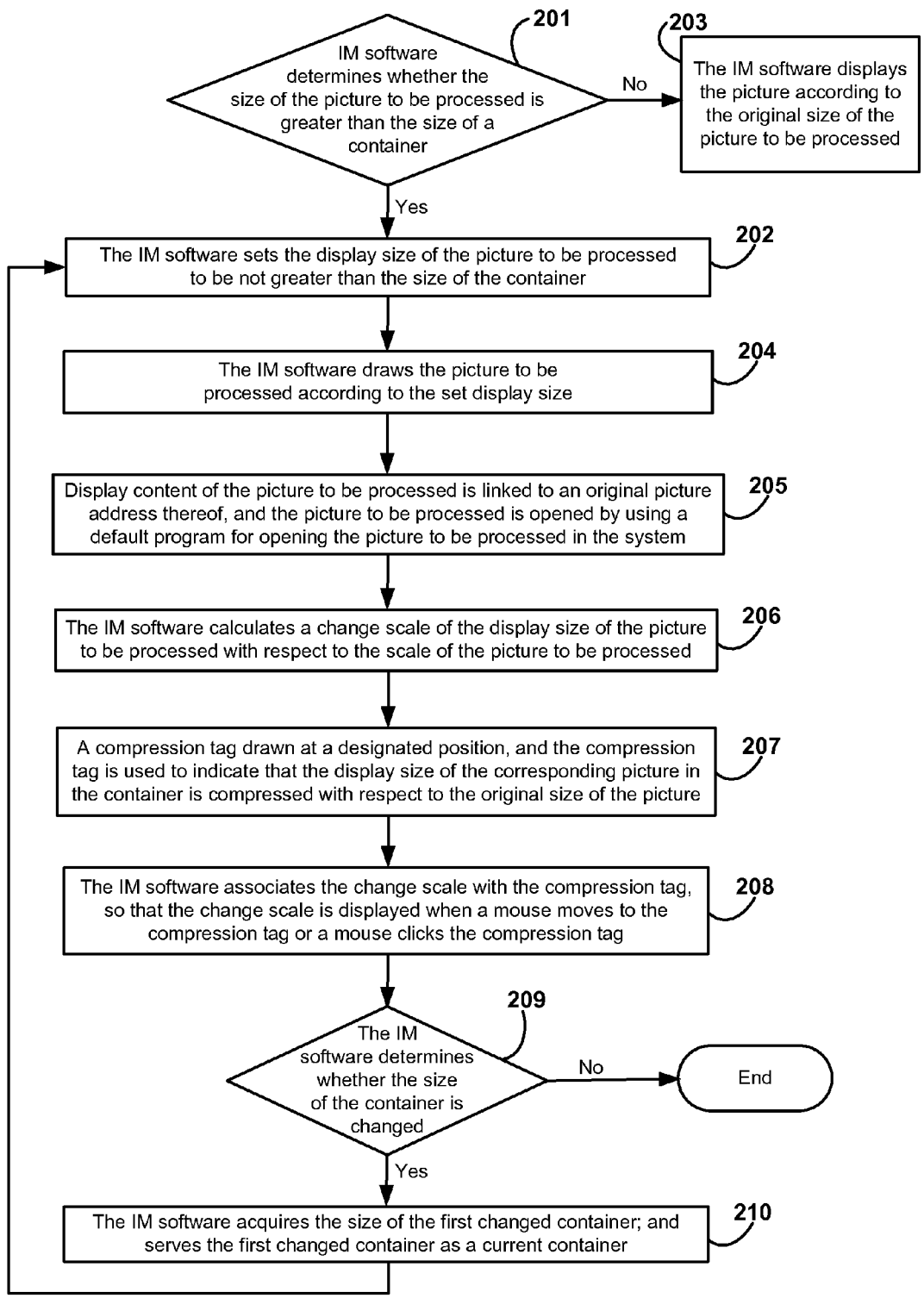
FIG. 2 is a flow chart of an improved method for displaying an IM message according to another embodiment of the present invention.

Referring now to FIG. 2, a method for displaying an IM message is shown according to another embodiment of the present invention, which is an improvement to the above disclosed method shown in FIG. 1. The improved method includes the following steps.

Step 201: IM software determines whether the size of a picture to be processed is greater than the size of a container. When the size of the picture to be processed is greater than the size of the container, step 202 is performed; otherwise, step 203 is performed.

To enable the solution in this embodiment to be more targeted, prior to the picture to be processed is processed correspondingly, the IM software first determines whether the size of the picture to be processed is greater than the size of the container, so as to further decide operation content of the next step.

Step 202: The IM software sets the display size of the picture to be processed to be not greater than the size of the container, and step 204 is performed.

When transmitting a picture by using the IM software, and the transmitted picture is greater than the size of the container of the IM software, the container of the IM software only displays a part of the picture while shielding the other part of the container, and thus a user needs to enlarge the container through dragging or move the scroll bar so as to view the entire content of the picture.

In order to enable the IM software to present the picture having the size greater than the container size completely to the user, prior to displaying the picture, the IM software sets the display size of the picture to be processed to be not greater than the size of the container.

In one embodiment, step 202 may include the following steps:

In the first step, the display width of the picture to be processed is set as the width of the container.

In the second step, the display height of the picture to be processed is set as the height of the container.

In the third step, the picture to be processed is drawn according to the set display width of the picture to be processed, that is, the width of the container, and the set display height of the picture to be processed.

The display width and height of the picture to be processed, that is, the width and height for drawing the picture to be processed in the IM software container are adapted to the width and height of the container. Therefore, when the IM software displays the picture to be processed according to the set display width, the width and height of the picture to be processed are definitely within the container.

In another embodiment, step 202 may include the following steps:

In the first step, the width of the IM software container is acquired, and the display width of the picture to be processed is set as the width of the IM software container.

In the second step, the display height of the picture to be processed is calculated according to a change rate of the display width of the picture to be processed with respect to the width of the picture to be processed.

Specifically, the display height of the picture to be processed is calculated according to a formula $h=h1*a1/a2$, where h represents the display height of the picture to be processed, h1 represents the height of the picture to be processed, a1 represents the width of the container, and a2 represents the width of the picture to be processed. The change rate of the display width of the picture to be processed with respect to the width of the picture to be processed is $k=a1/a2$.

In the third step, the picture to be processed is drawn according to the set display width of the picture to be processed, that is, the width of the container, and the calculated display height of the picture to be processed.

The display width of the picture to be processed, that is, the width for drawing the picture to be processed in the IM software container, is adapted to the width of the container, and therefore, when the IM software displays the picture to be processed according to the set display width, the width of the picture to be processed is definitely within the container.

In yet another embodiment, step 202 may include the following steps:

In the first step, the height of the IM software container is acquired, and the display height of the picture to be processed is set as the height of the container.

In the second step, the display width of the picture to be processed is calculated according to a change rate of the display height of the picture to be processed with respect to the height of the picture to be processed.

Specifically, the display width of the picture to be processed is calculated according to a formula $A=A1*H1/H2$, where A represents the display width of the picture to be processed, A1 represents the width of the picture to be processed, H1 represents the height of the container, and H2 represents the height of the picture to be processed. The change rate of the display height of the picture to be processed with respect to the height of the picture to be processed is $K=H1/H2$.

In the third step, the picture to be processed is drawn according to the calculated display width of the picture to be processed, and the display height of the picture to be processed.

The display height of the picture to be processed, that is, the height for drawing the software to be processed in the IM software container, is adapted to the height of the container, and therefore, when the IM software displays the picture to be processed according to the set display height, the height of the picture to be processed is definitely within the container.

Step 203: The IM software displays the picture according to the original size of the picture to be processed, and the procedure ends.

The size of the picture to be processed is less than the size of the IM software container, so the IM software container can present the entirety of the picture to the user. Therefore, the IM software just displays the picture according to the original size of the picture to be processed.

Step 204: The IM software draws the picture to be processed according to the set display size.

The picture having the size greater than the container size is drawn according to the set display size, and the display size of the picture has been set, by the IM software, to be not greater than the size of the container, so the IM software container can present the entire content of the picture to the user when displaying the picture.

Step 205: Display content of the picture to be processed is linked to an original address of the picture, and the picture to be processed is opened by using a system default program for opening a picture to be processed.

In order to make the user brow the original picture of the picture to be processed conveniently, the display content of the picture to be processed is linked to the original picture address, and when the compressed picture displayed in the IM software container, the picture to be processed is opened by using the default program for opening the picture to be processed in the system.

Step 206: The IM software calculates a change scale of the display size of the picture to be processed with respect to the scale of the picture to be processed.

Specifically, the change scale of the display size of the picture to be processed with respect to the size of the picture to be processed is M*M1, where M represents a ratio of the display width of the picture to be processed and the width of the container, and M1 represents a ratio of the display height of the picture to be processed and the height of the container.

Step 207: A compression tag is drawn at a designated position, and the compression tag is adapted to indicate that the display size of the corresponding picture in the container is compressed with respect to the original size of the picture.

In order to make the user of the IM software visually know whether the picture displayed in the container is zoomed out, a compression tag is drawn at a designated position, and the compression tag is adapted to indicate that the display size of the corresponding picture in the container is compressed with respect to the original size of the picture.

In the exemplary embodiment, the compression tag may be set at the lower right corner, upper right corner, lower left corner, or upper left corner of the picture, or a certain position in the picture.

When the compression tag is displayed at the corresponding position of the picture in the container, it indicates that the picture is compressed; and when no compression tag is displayed at the corresponding position of the picture in the container, it indicates that the picture is not compressed.

Step 208: The IM software associates the change scale with the compression tag, so that the change scale is displayed when a mouse moves to the compression tag.

In order to make the user of the IM software visually know the compression scale of the picture displayed in the container, the change scale of the picture is associated with the compression tag, so that the change scale is displayed when a mouse moves to the compression tag.

Step 209: The IM software determines whether the size of the container is changed. After the size of the container is changed to obtain a first changed container, step 210 is performed; otherwise, the procedure ends.

When a user uses the IM software, the user may enlarge or reduce the container by dragging, and after the container is enlarged or reduced, the picture that originally can be completely presented by the container cannot be completely displayed by the container due to the reduction of the container size, and the picture that originally cannot be completely displayed by the container can be completely displayed due to the enlargement of the container size.

Therefore, it is necessary to determine the size of the IM software container, so as to decide the next operation.

Step 210: The IM software acquires the size of the first changed container; and assigns the first changed container as a current container. Step 201 is then executed.

According to this embodiment of the method for displaying an IM message, when it is determined that the size of the picture to be processed is greater than the size of the IM software container, the IM software performs processing the picture to be processed, sets the display size of the picture to be processed to be not greater than the size of the IM software container, and displays the picture in the set display size of the picture to be processed. Accordingly, the picture to be processed that has the size originally greater than the size of the IM software container can be adapted to the size of the IM software container, and the IM software can directly display the entirety of the picture that is originally greater than the container size.

Moreover, after the size of the container is changed, the IM software resets the display size of the picture to be processed according to the changed size of the container, so that after the IM software container size is changed, the display size of the picture to be processed can still be adapted to the changed size of the container.

As shown in FIG. 2, step 201-step 204 may implement that the IM software draws the picture to be processed according to the set display size. In step 205, the display content of the picture to be processed is linked to the original picture address, and the picture to be processed is opened by using the default program for opening the picture to be processed in the system. In step 206-step 208, the compression scale is calculated and the compression tag is drawn. In step 209 and step 210, when the IM software container size is changed, the size of the displayed picture is processed corresponding. The operation sequence of the steps may be adjusted as required.

Preferably, the method according to the exemplary embodiment of the present invention may further include setting an identification mark for a message in the container, and after the container size is changed to obtain a second changed container, determining a position of the message in the second changed container according to the set identification mark. In one embodiment, the identification mark includes a predetermined mark. In another embodiment, the identification mark includes a set of sequence numbers of one or more characters in the message. In one embodiment, the one or more characters are selected from the visible content of the Nth line of the message. In one embodiment, the predetermined mark is visually displayed with the message. In one embodiment, the set of sequence number of the one or more characters in the message is not visually displayed with the message.

The above operation is performed to ensure that after the size of the container is changed, the content in the container before the change and the content in the container after the change are at the same position, thereby improving the use experience of the user.

The step of setting the identification mark for the message in the container includes setting an identification mark for visible content in the Nth line of the message in the container, where N is a positive integer.

During a specific implementation, the step of setting the identification mark for the message in the container further includes setting the identification mark at a designated position of a designated layer of the message in the container, or setting the identification mark in rendering data or padding data of the message in the container.

Figure 3:
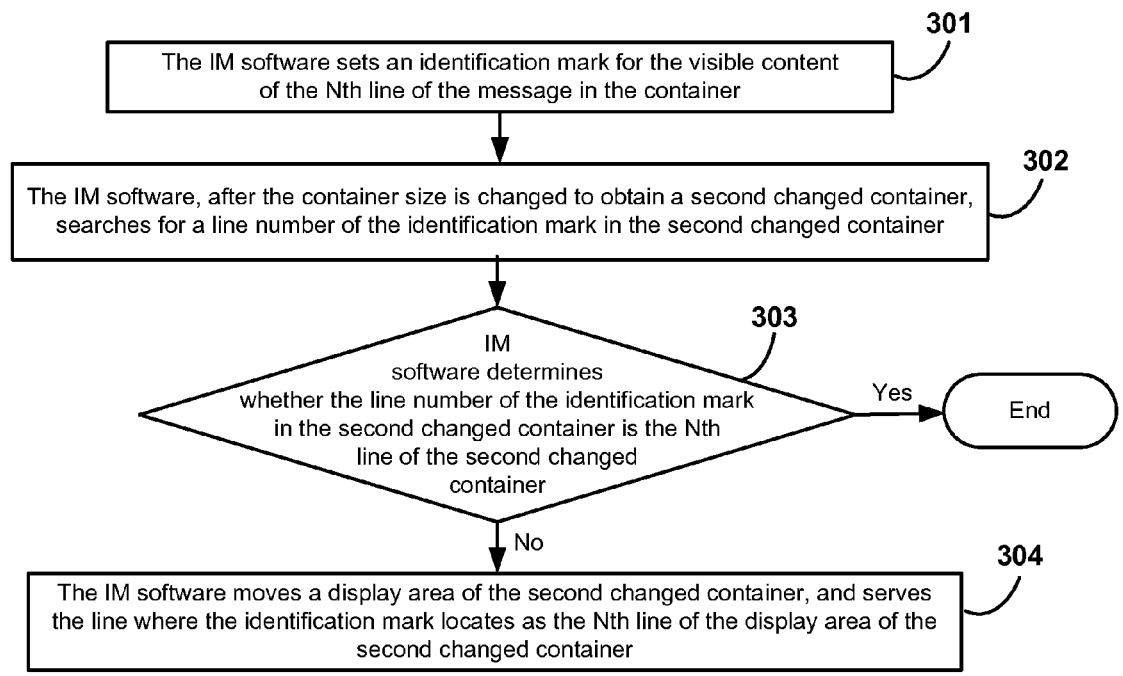
FIG. 3 is a flow chart of a method for displaying an IM message according to yet another embodiment of the present invention.

As shown in FIG. 3, this embodiment, among other things, provides an exemplary implementation method of setting the identification mark for the message in the container, and after the container size is changed to obtain the second changed container, determining the position of the message in the second changed container according to the set identification mark is provided. Specifically, the method includes the following steps.

Step 301: The IM software sets an identification mark for the visible content of the Nth line of the message in the container, where N is a no-zero natural number.

In order to search the visible content of the Nth line of the message in the container for in the subsequent steps, it is required to mark the visible content of the Nth line of the message in the container.

Step 302: The IM software, after the container size is changed to obtain the second changed container, searches for a line number of the identification mark in the second changed container.

After the size of the container is changed, the position of the message content in the container is changed, and the line number of the message content in the container is also changed, which may result in the change of a display line number of visible content of the first line in the container before the change.

In order to acquire whether the line number of the visible content of the first line in the container before the change is changed in the container after the change, after the container size is changed to obtain the second changed container, the IM software searches for the line number of the identification mark in the second changed container, thereby determining the line number of the visible content of the first line in the container before the change.

Step 303: The IM software determines whether the line number of the identification mark in the second changed container is the Nth line of the second changed container. When the line number of the identification mark in the second changed container is not the Nth line of the second changed container, step 304 is performed; otherwise, the procedure ends.

Step 304: A display area of the second changed container is moved, and the line where the identification mark locates is assigned as the Nth line of the display area of the second changed container. In certain embodiments, the display area of the second changed container is moved without scrolling.

In the method for displaying an IM message provided in this embodiment, after the size of the container is changed, the line number of the visible content, which is in the Nth line in the container before the change, in the container after the change is searched for, so as to determine whether the line number of the visible content, which is in the Nth line of the container before the change, in the container after the change is the Nth line; and when the line number of the visible content, which is in the Nth line of the container before the change, in the container after the change is not the Nth line, the display area of the container after the change is moved, and the line where the visible content of the Nth line in the container before the change is served as the Nth line of the display area of the container after the change. The position change of the visible content of the Nth line of the message in the container due to the change of the container size is alleviated, so that the visible content of the Nth line in the container is kept unchanged, thereby improving the use experience of the user.

The embodiment shown in FIG. 3 provides an implementation method of setting the identification mark for the visible content of the Nth line of the message in the container, and determining the position of the visible content of the Nth line in the second changed container according to the identification mark. The implementation about setting the identification mark at the designated position of the designated layer of the message in the container or setting the identification mark in rendering data or padding data of the message in the container, and determining the position of the message in the second changed container according to the identification mark is similar to that in the above embodiment, and is not repeated herein.

The embodiment of the present invention provides another method for displaying an IM message, as shown in FIG. 3. The method can execute the technical solution of this embodiment as required before, during, or after the execution of the method for displaying an IM message shown in FIG. 2.

Figure 4:
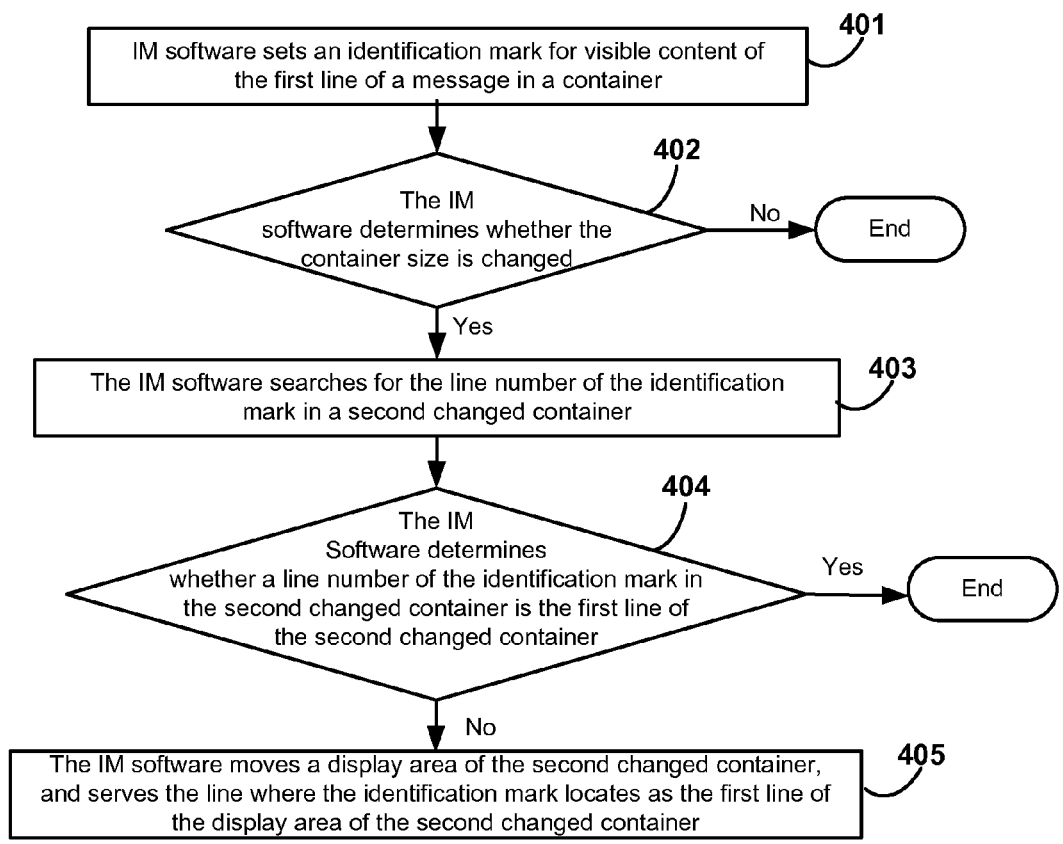
FIG. 4 is a flow chart of an improved method for displaying an IM message according to a further embodiment of the present invention.

Referring to FIG. 4, a method for displaying an IM message is shown according to another embodiment of the present invention, which is an improvement to the method shown in FIG. 3. Specifically, the improved method includes the following steps.

Step 401: IM software sets an identification mark for visible content of the first line of the message in the container.

In this step, any line of the message in the container may be marked as required, for example, the visible content of the first line in the container may be marked, or visible content of the third line in the container may be marked.

In one embodiment, the step may include inserting the identification mark at a preset position of the visible content of the first line of the message in the container.

Specifically, the identification mark in this step may be set in advance as required, for example, a special character, which will not occur or rarely occurs in a file, may be set as the identification mark. For example, "&" is set as the identification mark in this embodiment, and the identification mark may also be a character string, such as "#%&¥ . . . % . . . **".

After setting the identification mark, an insertion position of the identification mark, at the visible content of the first line is set as required, the preset position may be set randomly, for example, at the start of the visible content of the first line, or at the end of the visible content of the first line, or at a certain position at the middle of the visible content of the first line.

In another embodiment, the step includes selecting one or more characters from the visible content of the first line, acquiring a sequence number for each character in the whole message content, and designating a set of the acquired sequence number as the identification mark.

Specifically, a sequence number A of a first character of the visible content of the first line in the whole message content in the container may be selected and served as the identification mark; and two or more characters in the visible content of the first line may also be selected, sequence numbers of the two or more characters in the whole message content in the container are acquire, and a set {A1, A2, A3 . . . , An} is served as the identification mark.

Step 402: The IM software determines whether the container size is changed. After the container size is changed to obtain the second changed container, step 403 is performed; otherwise, the procedure ends.

Step 403: The IM software searches for the line number of the identification mark in the second changed container.

After the size of the container is changed, the position of the message content in the container is changed, and the line number of the message content in the container is also changed, thereby resulting in that the display line number of the visible content of the first line in the container before the change is changed in the container.

In order to acquire whether the line number of the visible content of the first line in the container before the change is changed in the container after the change, after the container size is changed to obtain the second changed container, the IM software searches for the line number of the identification mark in the second changed container, thereby determining the line number of the visible content of the first line in the container before the change in the container after the change.

Step 404: The IM software determines whether the line number of the identification mark in the second changed container is the first line of the second changed container. When the line number of the identification mark in the second changed container is not the first line of the second changed container, step 405 is performed; otherwise, the procedure ends.

After acquiring the line number, in the container after the change, of the visible content of the first line in the container before the change, the IM software determines whether the line number of the identification mark in the second changed container is the first line of the second changed container. When the line number of the identification mark in the second changed container is not the first line of the second changed container, step 405 is performed; otherwise, the procedure ends.

Step 405: The IM software moves the display area of the second changed container, and uses the line where the identification mark locates as the first line of the display area of the second changed container.

In order to display, in the first line of the container after the change, the visible content of the first line in the container before the change, while keeping the typesetting order of the whole message content in the container unchanged, even a start paragraph of the message content in the container starts to be display from the first line of the container, the IM software moves the display area of the second changed container, and uses the line where the identification mark locates as the first line of the display area of the second changed container.

In the method for displaying an IM message provided in this embodiment, when it is determined that the size of the picture to be processed is greater than the size of the IM software container, the IM software performs processing on the picture to be processed, sets the display size of the picture to be processed to be not greater than the size of the IM software container, and displays the picture with the set display size of the picture to be processed. Therefore, the picture to be processed that has the size originally greater than the size of the IM software container can be adapted to the size of the IM software container, and the IM software can directly display the entirety of the picture that is originally greater than the container size.

After the size of the container is changed, the line number of the visible content of the first line in the container before the change is searched for in the container after the change, so as to determine whether the line number of the visible content of the first line in the container before the change is the first line in the container after the change; when the line number, in the container after the change, of the visible content of the first line in the container before the change is not the first line, the display area of the container after the change is moved, and the line where the visible content of the first line in the container before the change locates is served as the first line of the display area of the container after the change. The position change of the visible content of the first line of the message in the container due to the change of the container size is alleviated, so that the visible content of the first line in the container is kept unchanged, thereby improving the use experience of the user.

Figure 5:
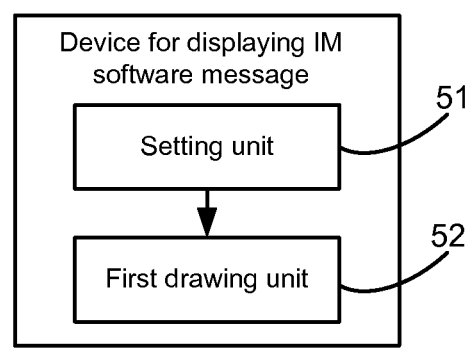
FIG. 5 is a structural view of an apparatus for displaying an IM message according to one embodiment of the present invention.

Referring to FIG. 5, an apparatus for displaying an IM message is shown according to one embodiment of the present invention. The apparatus includes a setting unit 51 and a first drawing unit 52.

When the size of a picture to be processed is greater than the size of a container, the setting unit 51 sets the display size of the picture to be processed to be not greater than the size of the container; and the first drawing unit 52 draws the picture to be processed according to the set display size.

In the apparatus for displaying an IM message provided in this embodiment, when the size of the picture to be processed is greater than the size of the IM software container, the IM software performs processing on the picture to be processed, the setting unit sets the display size of the picture to be processed to be not greater than the size of the IM software container, and the first drawing unit displays the picture with the set display size of the picture to be processed. Therefore, the picture to be processed that has the size originally greater than the size of the IM software container can be adapted to the size of the IM software container, and the IM software can directly display the entirety of the picture that is originally greater than the container size.

Figure 6:
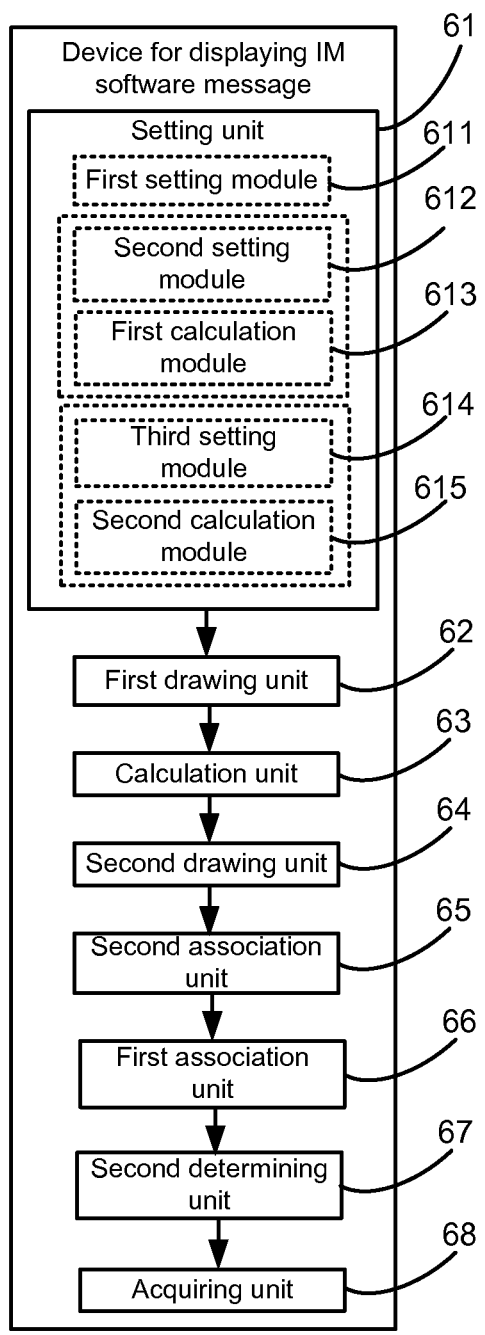
FIG. 6 is a structural view of an improved apparatus for displaying an IM message according to another embodiment of the present invention.

FIG. 6 shows another embodiment of the apparatus for displaying an IM message according to the present invention. Specifically, the apparatus includes a setting unit 61, a first drawing unit 62, a calculation unit 63, a second drawing unit 64, a second association unit 65, a first association unit 66, a second determining unit 67, and an acquiring unit 68.

As shown in a dashed part in FIG. 6, the setting unit 61 may include a first setting module 611, or a second setting module 612 and a first calculation module 613, or a third setting module 614 and a second calculation module 615.

When the size of a picture to be processed is greater than the size of a container, the setting unit 61 sets the display size of the picture to be processed to be not greater than the size of the container.

The embodiment of the present invention provides an implementation, in which the setting unit 61 includes the first setting module 611.

Specifically, the first setting module 611 sets the display width of the picture to be processed to the width of the container, and the first setting module 611 sets the display height of the picture to be processed to the height of the container.

The display width and height of the picture to be processed, that is, the width and height for drawing the software to be processed in the IM software container, are adapted to the width and height of the container. Therefore, when the IM software displays the picture to be processed according to the set display width, the width and height of the picture to be processed are definitely within the container.

In one embodiment, the setting unit 61 includes the second setting module 612 and the first calculation module 613.

Specifically, the second setting module 612 sets the display width of the picture to be processed to the width of the container; and the first calculation module 613 calculates the display height of the picture to be processed according to a change rate of the display width of the picture to be processed with respect to the width of the picture to be processed.

The first calculation module 623 calculates the display height of the picture to be processed according to a formula $h=h1*a1/a2$, where h represents the display height of the picture to be processed, h1 represents the height of the picture to be processed, a1 represents the width of the container, and a2 represents the width of the picture to be processed.

The display width of the picture to be processed, that is, the width for drawing the software to be processed in the IM software container, is adapted to the width of the container, and therefore, when the IM software displays the picture to be processed according to the set display width, the width of the picture to be processed is definitely within the container.

In another embodiment, the setting unit 61 includes the third setting module 614 and the second calculation module 615.

Specifically, the third setting module 614 sets the display height of the picture to be processed to the height of the container; and the second calculation module 615 calculates the display width of the picture to be processed according to a change rate of the display height of the picture to be processed with respect to the height of the picture to be processed.

The second calculation module 615 calculating the display width of the picture to be processed according to the change rate of the display height of the picture to be processed with respect to the height of the picture to be processed is specifically: the second calculation module calculates the display width of the picture to be processed according to a formula $A=A1*H1/H2$, where A represents the display width of the picture to be processed, A1 represents the width of the picture to be processed, H1 represents the height of the container, and H2 represents the height of the picture to be processed.

The display height of the picture to be processed, that is, the height for drawing the software to be processed in the IM software container, is adapted to the height of the container, and therefore, when the IM software displays the picture to be processed according to the set display height, the height of the picture to be processed is definitely within the container.

The first drawing unit 62 draws the picture to be processed according to the display width and the display height of the picture to be processed set by the setting unit 61.

The calculation unit 63 calculates a change scale of the display size of the picture to be processed with respect to the size of the picture to be processed.

In order to facilitate the user to identify whether the picture displayed in the IM software container is compressed, the second drawing unit 54 draws a compression tag at a designated position, the compression tag being adapted to indicate that the display size of the corresponding picture in the container is compressed with respect to the original size of the picture.

In order to facilitate the user to view an original picture of the picture in the IM software container, the second association unit 65 links the display content of the picture to be processed to an original picture address thereof.

In the exemplary embodiment, the apparatus provides a picture opening unit, and the picture opening unit is adapted to open the picture to be processed by using a default program for opening the picture to be processed in a system, so as to facilitate the processing on the picture to be processed.

In order to facilitate the user to learn a compress scale of the compressed picture in the IM software, the first association unit 66 associates the change scale with the compression tag, so that the change scale is displayed when a mouse moves to the compression tag or a mouse clicks the compression tag.

The second determining unit 67 determines whether the size of the container is changed.

When the second determining unit 67 determines that the size of the container is changed to obtain the first changed container, the acquiring unit 68 acquires the size of the first changed container, and uses the first changed container as a current container.

In the apparatus for displaying an IM message provided in this embodiment, when the size of the picture to be processed is greater than the size of the IM software container, the IM software performs processing on the picture to be processed, the setting unit sets the display size of the picture to be processed to be not greater than the size of the IM software container, the first drawing unit displays the picture with the set display size of the picture to be processed. Therefore, the picture to be processed that has the size originally greater than the size of the IM software container can be adapted to the size of the IM software container, and the IM software can directly display the entirety of the picture that is originally greater than the container size.

Moreover, after the size of the container is changed, the IM software resets the display size of the picture to be processed according to the changed size of the container, so that after the IM software container size is changed, the display size of the picture to be processed can still be adapted to the changed size of the container.

In the embodiment of the present invention, the apparatus for displaying an IM message is further specifically adapted to set an identification mark for a message in the container, and after the container size is changed to obtain the second changed container, determine a position of the message in the second changed container according to the set identification mark, so as to ensure that, after the size of the container is changed, the position of the content in the container before the change is kept unchanged in the container after the change, thereby improving the use experience of the user.

In one embodiment, the identification mark includes a predetermined mark. In another embodiment, the identification mark includes a set of sequence numbers of one or more characters in the message. In one embodiment, the one or more characters are selected from the visible content of the Nth line of the message. In one embodiment, the predetermined mark is visually displayed with the message.

In one embodiment, the set of sequence number of the one or more characters in the message is not visually displayed with the message.

The setting the identification mark for the message in the container includes: setting an identification mark for visible content of the Nth line of the message in the container, where N is a natural number, not zero.

Figure 7:
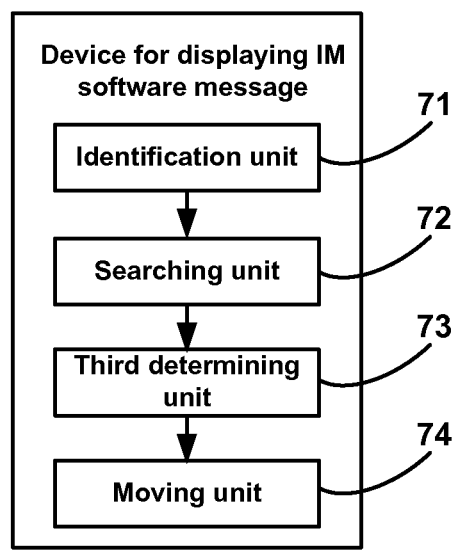
FIG. 7 is a structural view of an apparatus for displaying an IM message according to yet another embodiment of the present invention.

As shown in FIG. 7, when setting the identification mark for the visible content of the Nth line of the message in the container, the apparatus for displaying an IM message includes an identification unit 71, a searching unit 72, a first determining unit 73, and a moving unit 74.

The identification unit 71 sets the identification mark for the visible content of the Nth line of the message in the container. In order to make the visible content of the Nth line of the message in the container searchable for in the subsequent step, it is required to mark the visible content of the Nth line of the message in the container. Any line of the message in the container may be marked as required, for example, the visible content of the first line in the container may be marked, or visible content of the third line in the container may be marked.

The embodiment of the present invention provides an implementation. Specifically, the identification unit 71 inserts the identification mark at a preset position of the visible content of the first line of the message in the container.

The embodiment of the present invention provides another implementation. Specifically, the identification unit 71 selects one or more characters from the visible content of the first line, acquires a sequence number of each character in the whole message content, and designates a set of the acquired sequence number as the identification mark.

After the container size is changed to obtain the second changed container, the searching unit 72 searches for the line number of the identification mark in the second changed container.

The first determining unit 73 determines whether the line number of the identification mark in the second changed container is the first line of the second changed container.

When the line number of the identification mark in the second changed container is not the first line of the second changed container, the moving unit 74 moves a display area of the second changed container, and serves the line where the identification mark locates as the first line of the display area of the second changed container.

In the apparatus for displaying an IM message provided in this embodiment, when it is determined that the size of the picture to be processed is greater than the size of the IM software container, the IM software performs processing on the picture to be processed, after the size of the container is changed, the searching unit searches for the line number, in the container after the change, of the visible content of the first line in the container before the change, the third determining unit determines whether the line number of the visible content of the first line in the container before the change is the first line in the container after the change; when the line number of the visible content of the first line in the container before the change is not the first line in the container after the change, the moving unit moves the display area of the container after the change, and serves the line where the visible content of the first line in the container before the change locates as the first line of the display area of the container after the change. The position change of the visible content of the first line of the message in the container due to the change of the container size is alleviated, so that the visible content of the first line in the container is kept unchanged, thereby improving the use experience of the user.

The embodiment of the present invention provides another apparatus for displaying an IM message, as shown in FIG. 7. The apparatus can execute the technical solution of this embodiment as required before or after each operation unit of the apparatus for displaying an IM message shown in FIG. 6 executes the operation.

Through the above description of the implementations, it is clear to persons skilled in the art that the present invention may be accomplished through software plus a necessary universal hardware platform, or through hardware, and the former one is preferred mostly. Based on this, the above technical solution or the part that makes contributions to the prior art can be substantially embodied in the form of a software product. The computer software product may be stored in the non-transitory computer readable storage medium such as a floppy disk, a hard disk, an optical disk, read-only memory (ROM), random memory (RAM), flash dive, or the likes, and contain instructions to instruct apparatus or equipment (for example, a personal computer, a server, or network equipment) to perform the method described in the embodiments of the present invention.

In sum, the present invention recites, among other things, a method and an apparatus for display IM message. The method includes, when the size of a picture to be processed is greater than the size of a container, setting the display size of the picture to be processed to be not greater than the size of the container; and drawing the picture to be processed according to the set display size. As such, a picture to be processed having the size greater than the container size can be adapted to the size of a container in IM software, and the IM software can directly display the entirety of the picture that is originally greater than the container size.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for displaying an Instant Messaging (IM) message, comprising:
   when a size of a picture to be processed is greater than a size of a container, setting a display size of the picture to be processed to be not greater than the size of the container;
   drawing the picture to be processed according to the set display size;
   setting an identification mark for visible content of the Nth line of a message in the container, wherein N is a positive integer, and the identification mark comprises a set of sequence numbers of one or more characters in the message, the one or more characters being selected from the visible content of the Nth line of the message, wherein the set of sequence number of the one or more characters in the message is not visually displayed with the message;

after the container size is changed to obtain a second changed container, searching for a line number of the identification mark in the second changed container;

determining whether the line number of the identification mark in the second changed container is the Nth line in the second changed container; and when the line number of the identification mark in the second changed container is not the Nth line in the second changed container, moving a display area of the second changed container without scrolling, and assigning a line where the identification mark locates as the Nth line of the display area of the second changed container.

2. The method for displaying an IM message according to claim 1, wherein the step of setting the identification mark for the visible content of the Nth line of the message in the container comprises:

selecting the one or more characters from the visible content of the Nth line, acquiring a sequence number of each selected character in the whole message content; and designating the set of the acquired sequence number as the identification mark.

3. The method for displaying an IM message according to claim 1, further comprising:

calculating a change scale of the display size of the picture to be processed with respect to the size of the picture to be processed;

drawing a compression tag at a designated position of the picture, the compression tag being adapted to indicate that the display size of the corresponding picture in the container is compressed with respect to the size of the picture; and associating the change scale with the compression tag, so that the change scale is displayed when a mouse moves to the compression tag or a mouse clicks the compression tag.

4. The method for displaying an IM message according to claim 1, prior to the step of setting the display size of the picture to be processed to be not greater than the size of the container, further comprising:

determining whether the size of the container is changed; and after the size of the container is changed to obtain a first changed container, acquiring the size of the first changed container, and assigning the first changed container as a current container.

5. The method for displaying an IM message according to claim 1, further comprising:

linking display content of the picture to be processed to an original address of the picture.

6. The method for displaying an IM message according to claim 1, further comprising:

opening the picture to be processed by using a system default program for opening a picture to be processed.

7. The method for displaying an IM message according to claim 1, wherein the step of setting the display size of the picture to be processed to be not greater than the size of the container comprises one of:

setting a display width of the picture to be processed to a width of the container, and setting a display height of the picture to be processed to a height of the container;

setting the display width of the picture to be processed to the width of the container; and calculating the display height of the picture to be processed according to a change rate of the display width of the picture to be processed with respect to the width of the picture to be processed; and setting the display height of the picture to be processed to the height of the container; and calculating the display width of the picture to be processed according to a change rate of the display height of the picture to be processed with respect to the height of the picture to be processed.

8. The method for displaying an IM message according to claim 7, wherein the step of drawing the picture to be processed according to the set display size comprises: drawing the picture to be processed according to the display width and the display height of the picture to be processed.

9. An apparatus for displaying an Instant Messaging (IM) message, comprising:

a processing unit comprising one or more processors;

a setting unit, adapted to set a display size of the picture to be processed to be not greater than a size of a container when the size of a picture to be processed is greater than the size of the container; and a first drawing unit, adapted to draw the picture to be processed according to the set display size;

an identification unit, adapted to set an identification mark for visible content of the Nth line of a message in the container, wherein N is a positive integer, and the identification mark comprises a set of sequence numbers of one or more characters in the message, the one or more characters being selected from the visible content of the Nth line of the message, wherein the set of sequence number of the one or more characters in the message is not visually displayed with the message;

a searching unit, used to search for a line number of the identification mark in the second changed container after the container size is changed to obtain a second changed container;

a first determining unit, adapted to determine whether the line of the identification mark in the second changed container is in the Nth line second changed container; and a moving unit, used to move a display area of the second changed container without scrolling when the line number of the identification mark in the second changed container is not the Nth line in the second changed container, and assign a line where the identification mark locates as the Nth line of the display area in the second changed container.

10. The apparatus for displaying an IM message according to claim 9, wherein the identification unit for setting the identification mark for the visible content of the Nth line of the message in the container is further adapted to select the one or more characters from the visible content of the Nth line, acquire a sequence number of each selected character in the whole message content; and designate the set of the acquired sequence number as the identification mark.

11. The apparatus for displaying an IM message according to claim 9, further comprising:

a calculation unit, adapted to calculate a change scale of the display size of the picture to be processed with respect to the size of the picture to be processed;

a second drawing unit, adapted to draw a compression tag at a designated position of the picture, the compression tag being adapted to indicate that the display size of the corresponding picture in the container is compressed with respect to the size of the picture; and a first association unit, adapted to associate the change scale with the compression tag, so that the change scale is displayed when a mouse moves to the compression tag, or a mouse clicks the compression tag.

12. The apparatus for displaying an IM message according to claim 9, further comprising:
   a second determining unit, adapted to determine whether the size of the container is changed;
   an acquiring unit, adapted to acquire the size of the first changed container after the size of the container is changed to obtain a first changed container, and assign the first changed container as the current container.

13. The apparatus for displaying an IM message according to claim 9, further comprising:
   a second association unit, adapted to link display content of the picture to be processed to an original address of the picture.

14. The apparatus for displaying an IM message according to claim 9, further comprising:
   a picture opening unit, adapted to open the picture to be processed by using a system default program for opening a picture to be processed.

15. The apparatus for displaying an IM message according to claim 9, wherein the setting unit comprises one of:
   a first setting module, adapted to set a display width of the picture to be processed to a width of the container, and set a display height of the picture to be processed to a height of the container;
   a second setting module, adapted to set the display width of the picture to be processed to the width of the container; and calculate the display height of the picture to be processed according to a change rate of the display width of the picture to be processed with respect to the width of the picture to be processed; and
   a third setting module, adapted to set the display height of the picture to be processed to the height of the container; and calculate the display width of the picture to be processed according to a change rate of the display height of the picture to be processed with respect to the height of the picture to be processed.

16. The apparatus for displaying an IM message according to claim 15, wherein the drawing unit for drawing the picture to be processed according to the set display size is further adapted to draw the picture to be processed according to the display width and the display height of the picture to be processed.

17. A non-transitory computer-readable medium storing instructions which, when executed by one or more processors, cause an apparatus to perform a method for displaying an IM message, the method comprising:
   when a size of a picture to be processed is greater than a size of a container, setting a display size of the picture to be processed to be not greater than the size of the container;
   drawing the picture to be processed according to the set display size;
   setting an identification mark for visible content of the Nth line of a message in the container, wherein N is a positive integer, and the identification mark comprises a set of sequence numbers of one or more characters in the message, the one or more characters being selected from the visible content of the Nth line of the message, wherein the set of sequence number of the one or more characters in the message is not visually displayed with the message;
   after the container size is changed to obtain a second changed container, searching for a line number of the identification mark in the second changed container;
   determining whether the line number of the identification mark in the second changed container is the Nth line in the second changed container; and
   when the line number of the identification mark in the second changed container is not the Nth line in the second changed container, moving a display area of the second changed container without scrolling, and assigning a line where the identification mark locates as the Nth line of the display area of the second changed container.

18. The non-transitory computer-readable medium according to claim 17, further comprising:
   calculating a change scale of the display size of the picture to be processed with respect to the size of the picture to be processed;
   drawing a compression tag at a designated position of the picture, the compression tag being adapted to indicate that the display size of the corresponding picture in the container is compressed with respect to the size of the picture; and
   associating the change scale with the compression tag, so that the change scale is displayed when a mouse moves to the compression tag or a mouse clicks the compression tag.

19. The non-transitory computer-readable medium according to claim 17, prior to the step of setting the display size of the picture to be processed to be not greater than the size of the container, further comprising:
   determining whether the size of the container is changed; and
   after the size of the container is changed to obtain a first changed container, acquiring the size of the first changed container, and assigning the first changed container as a current container.

20. The non-transitory computer-readable medium according to claim 17, further comprising:
   linking display content of the picture to be processed to an original address of the picture.

* * * * *